US012325257B2

(12) United States Patent
Lowes

(10) Patent No.: US 12,325,257 B2
(45) Date of Patent: Jun. 10, 2025

(54) POCKET SIZE PEN

(71) Applicant: Justin Lowes, London (GB)

(72) Inventor: Justin Lowes, London (GB)

( * ) Notice: Subject to any disclaimer, the term of this patent is extended or adjusted under 35 U.S.C. 154(b) by 59 days.

(21) Appl. No.: 18/219,153

(22) Filed: Jul. 7, 2023

(65) Prior Publication Data

US 2023/0347681 A1 Nov. 2, 2023

(51) Int. Cl.

| | |
|---|---|
| ***B43K 5/02*** | (2006.01) |
| ***B43K 5/00*** | (2006.01) |
| ***B43K 7/00*** | (2006.01) |
| ***B43K 7/02*** | (2006.01) |
| ***B43K 8/00*** | (2006.01) |
| ***B43K 8/20*** | (2006.01) |
| ***B43K 23/12*** | (2006.01) |

(52) U.S. Cl.
CPC .............. *B43K 5/005* (2013.01); *B43K 7/005* (2013.01); *B43K 7/02* (2013.01); *B43K 8/003* (2013.01); *B43K 8/20* (2013.01); *B43K 23/126* (2013.01)

(58) Field of Classification Search
CPC .......... B43K 5/005; B43K 5/02; B43K 7/005; B43K 7/02; B43K 8/003
USPC .......................................................... 401/222
See application file for complete search history.

(56) References Cited

U.S. PATENT DOCUMENTS

| | | | |
|---|---|---|---|
| 7,168,105 B2 * | 1/2007 | Adelman | B43K 29/12 401/95 |
| 2019/0111726 A1 * | 4/2019 | Nielson | B43K 7/005 |

* cited by examiner

*Primary Examiner* — Jennifer C Chiang

(57) ABSTRACT

The adaptation of a pocket-size pen for use by a person is provided. The pen includes a cap with internally configured male threads, and a body. The body includes a barrel with externally configured and spaced apart first set of female threads, and second set of female threads. The barrel is hollow inside with a top opening for receiving a full-sized standard ink source. The male threads of the cap engage the second set of female threads of the pen body for closing a writing tip and reducing the length of the pen for storage in the pocket of a user. The male threads of the cap engage the first set of female threads of the body for transforming the pen into an extended-length pen similar in length to a conventional pen and revealing the writing tip for comfortable writing using the pen.

19 Claims, 10 Drawing Sheets

POCKET SIZE PEN

TECHNICAL FIELD

The present invention relates to writing instruments. More particularly, the invention relates to a compact pocket-size pen, which is, in its compact state or closed state, is relatively shorter in length (approximately 20 mm shorter than conventional pens) and can be transformed into an extended-length pen to allow comfortable writing like any other conventional pens without compromising aesthetics and without limiting the size of ink source that it carries.

BACKGROUND

Lots of traditional and modern pens (especially fountain pens) are provided with detachable caps that need to be removed in order to use the pen and replace again over the writing end of the pens before placing the pen in the pocket so as to prevent the clothes (such as pants) from coming into contact with the ink.

While in recent years considerable improvements have been made in pens, particularly fountain pens, the efforts have generally been directed towards the ink-feeding means or ink sources and associated parts, and little or no consideration has been given to the handling or ease of carrying of the pen in itself.

Despite some attempts made in the past to provide reduced-size pens or compact pens so that they can be carried in pockets with ease, such pens are designed or provided by sacrificing ink capacity, writing comfort and aesthetics. Research in the field of pens shows that minimizing the size of pens leads to the accommodation of smaller sizes of ink sources (E.g., micro converter or small cartridge). Further, in use, these compact pens do not provide writing comfort due to their reduced length.

The inventor herein proposes the smallest possible pen size designed to accommodate a full-sized standard ink source and when required can be converted to an extended-length pen to allow comfortable writing like any other conventional pen.

BRIEF SUMMARY

It is an objective of the present invention to provide an everyday carry pen that's compact in size for storage in the pocket of a user without sacrificing writing comfort and the size of the ink source it carries.

Another object of the present invention is to provide a pocket-size pen (Eg. fountain pen, ball point pen, and/or rollerball pen) that carries a standard-size ink converter and/or refills.

According to an embodiment of the present invention, a pocket-size pen is provided. The pocket-size pen includes a pen cap having an internally configured first set of male threads. The pen cap comprises an inner cap consisting of the first set of male threads configured on the inner walls, a protruding threaded extension from the top, and a third set of female threads configured externally, and an outer cap open at two opposing ends, and configured for receiving the inner cap.

In an embodiment, the pen cap includes a clip having a first ring with a hole and an arm extending downwardly from the first ring, a second ring, a first end cap with a top and a downwardly extending sidewall, a second end cap with a second set of male threads internally configured to engage to the third set of female threads of the inner cap, and a flat dome configured to attach and close the top of the first end cap.

In an embodiment, the pocket-size pen includes a pen body adapted to be grasped during use. The pen body comprises a barrel having externally configured and spaced apart a first set of female threads, and a second set of female threads. The barrel is hollow inside with a top opening for receiving a full-sized standard ink source there inside. The pen body further includes a collar with a third set of male threads externally configured thereon. The third set of male threads engages with a fourth set of female threads configured internally in proximity to the top opening of the barrel, and a tip connector with a fourth set of male threads for engagement with a fifth set of female threads configured internally within the collar, and the writing tip with a first end and a second end, wherein the writing tip is in fluid communication with the ink source for receiving ink therefrom. The collar of the pen body is graspable by the user while using the pocket-size pen for writing.

In an embodiment, the first set of male threads of the pen cap engages the second set of female threads of the pen body for closing a writing tip and reducing the length of the pocketsize pen for storage in the pocket of a user.

In an embodiment, the first set of male threads of the pen cap engages the first set of female threads of the pen body for transforming the pocket-size pen into an extended-length pen similar in length to a conventional pen and revealing the writing tip for comfortable writing using the pen.

In an embodiment, the tip connector further comprises a hole partially extending along the length of the tip connector. The hole is adapted for receiving the second end of the writing tip in order to dispense the ink through the first end while writing with the pocket size pen.

In an embodiment, the full-sized standard ink source is an ink converter. The ink converter is about 7.5 cm or 7.6 cm in length.

In an embodiment, the full-sized standard ink source is an ink refill for ball point pen and/or rollerball pen.

In an embodiment, the pocket-size pen is a fountain pen, or rollerball pen or a ball point pen.

In an embodiment, the first set of female threads of the pen body divides the barrel into a first portion, and a second portion. The first portion is larger in length compared to the second portion and is either uniform or non-uniform in diameter throughout its length. The second portion is uniform in diameter throughout its length or non-uniform in diameter throughout its length.

Various advantages and features of the present invention are described herein with specificity so as to make the present invention understandable to one of ordinary skill in the art, both with respect to how to practice the present invention and how to make the present invention.

BRIEF DESCRIPTION OF THE DRAWINGS

The above set forth and other features of the present invention are made more apparent in the ensuing description of the preferred embodiments when read in conjunction with the attached drawings, wherein.

DETAILED DESCRIPTION

Certain terminology is used in the following description for reference only and is not limiting. Unless specifically set forth herein, the terms "a," "an," and "the" are not limited to one element, but instead should be read as meaning "at least one." The terminology includes the words noted above, derivatives thereof, and words of similar import. Before describing the present invention in detail, it should be observed that the present invention utilizes a combination of components, which constitutes a compact pocket-size pen. Accordingly, the components have been represented, showing only specific details that are pertinent for an understanding of the present invention so as not to obscure the disclosure with details that may be readily apparent to those with ordinary skill in the art having the benefit of the description herein. As required, the detailed embodiments of the present invention are disclosed herein. However, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The words "comprising", "having", "containing", and "including", and other forms thereof, are intended to be equivalent in meaning and be open-ended in that an item or items following any one of these words is not meant to be an exhaustive listing of such item or items or meant to be limited to only the listed item or items.

Referring now to the accompanying FIGS. 1-12, a pocket-size pen 100 and its various components are shown. From herein the pocket-size pen 100 will be referred to as pen 100. The pen 100 may be a fountain pen or a rollerball pen or a ballpoint pen any other similar pen. The pen 100 includes a pen cap 102 and a pen body 104.

Figure 1:
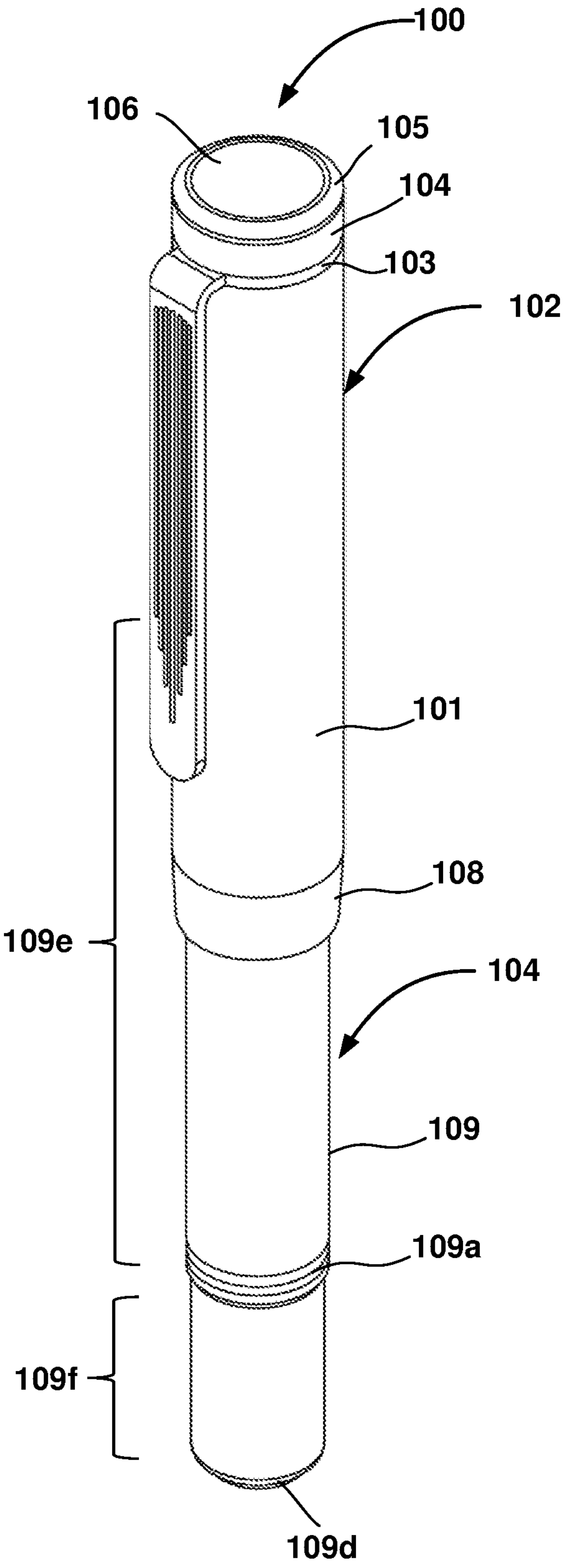
FIG. 1 shows a front perspective view of a pocket-size pen of the present invention, according to an embodiment of the present invention.
Figure 2:
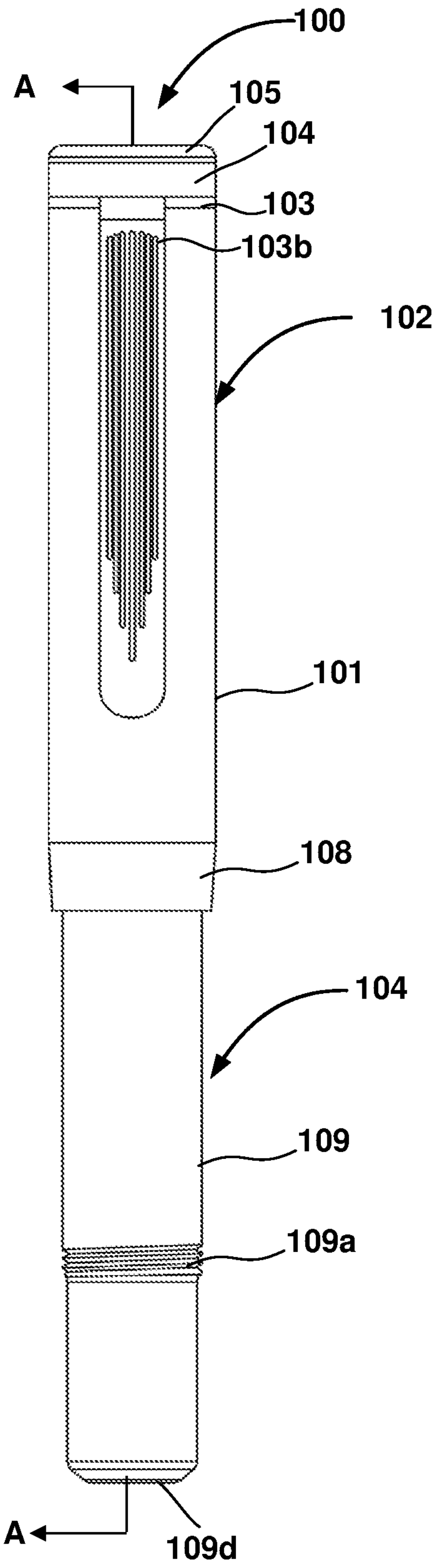
FIG. 2 shows a front view of the pocket-size pen of FIG. 1.
Figure 3:
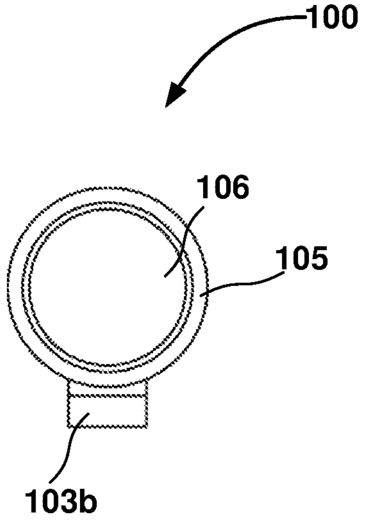
FIGS. 3 and 4 show a top view and a bottom view of the pocket-size pen of FIG. 1, respectively.
Figure 4:
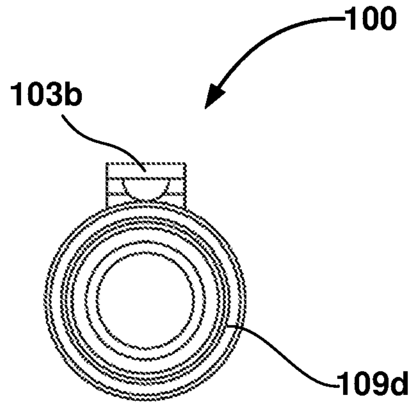
Figure 5:
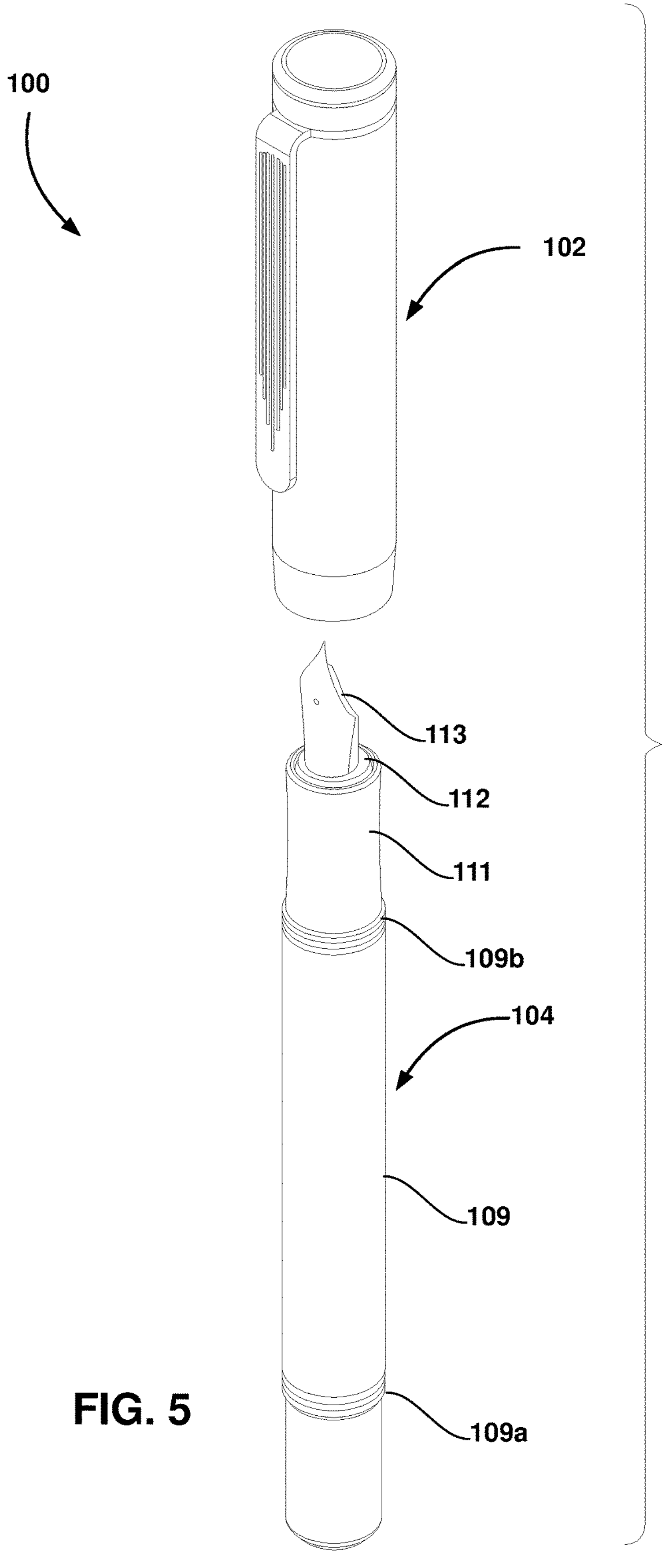
FIG. 5 shows a partially exploded view of the pocket-size pen of FIG. 1.
Figure 6:
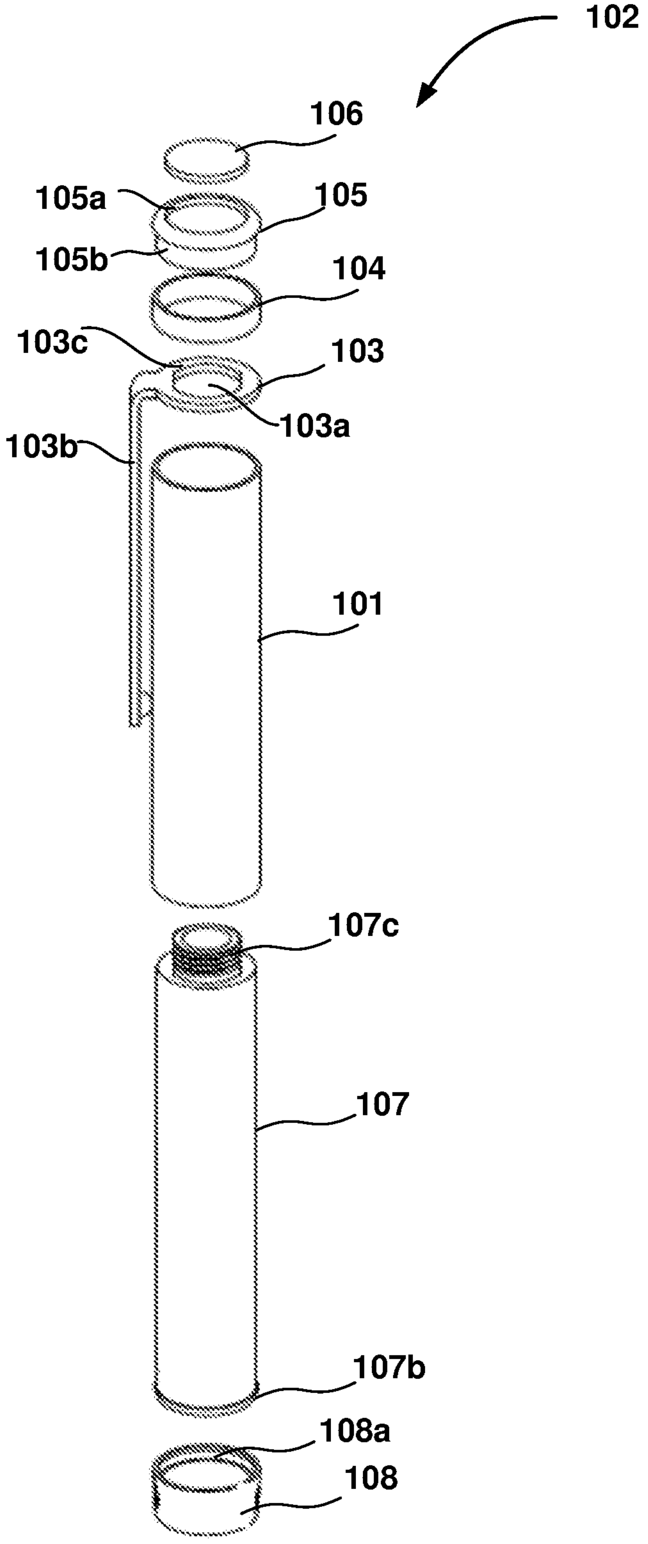
FIG. 6 shows an exploded view of the pen cap of the pocket-size pen of FIG. 5.
Figure 7:
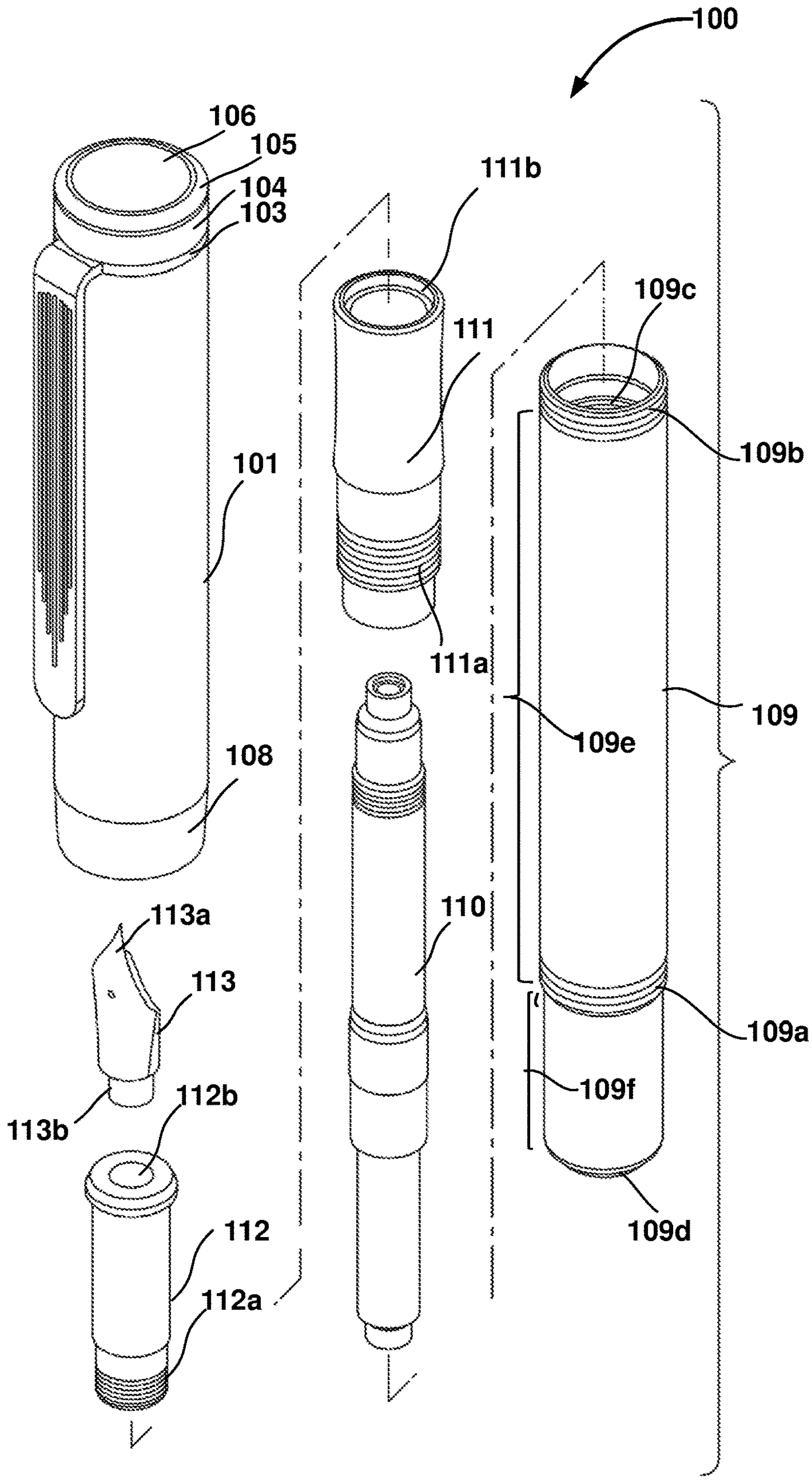
FIG. 7 shows a more detailed exploded view of the pocket-size pen of FIG. 1.
Figure 8:
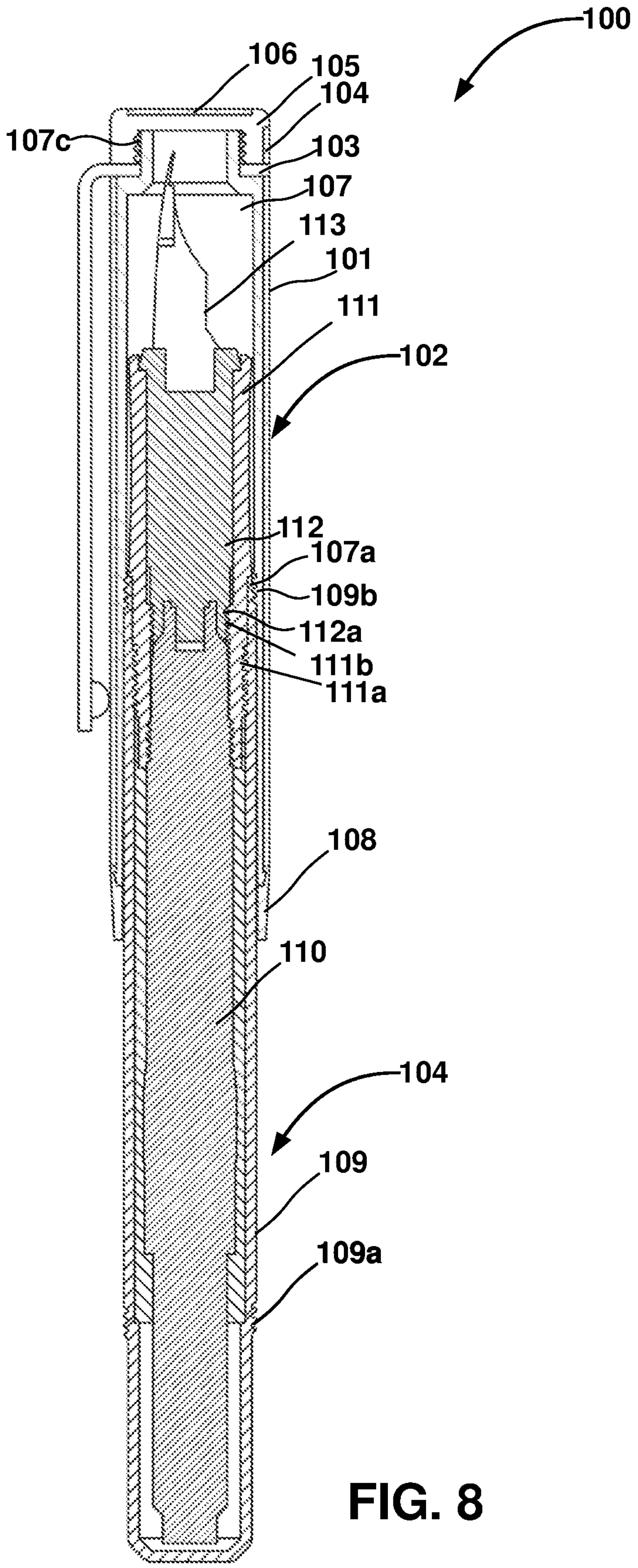
FIG. 8 is a cross-sectional view of the pocket-size pen of FIG. 2 along A-A.
Figure 9:
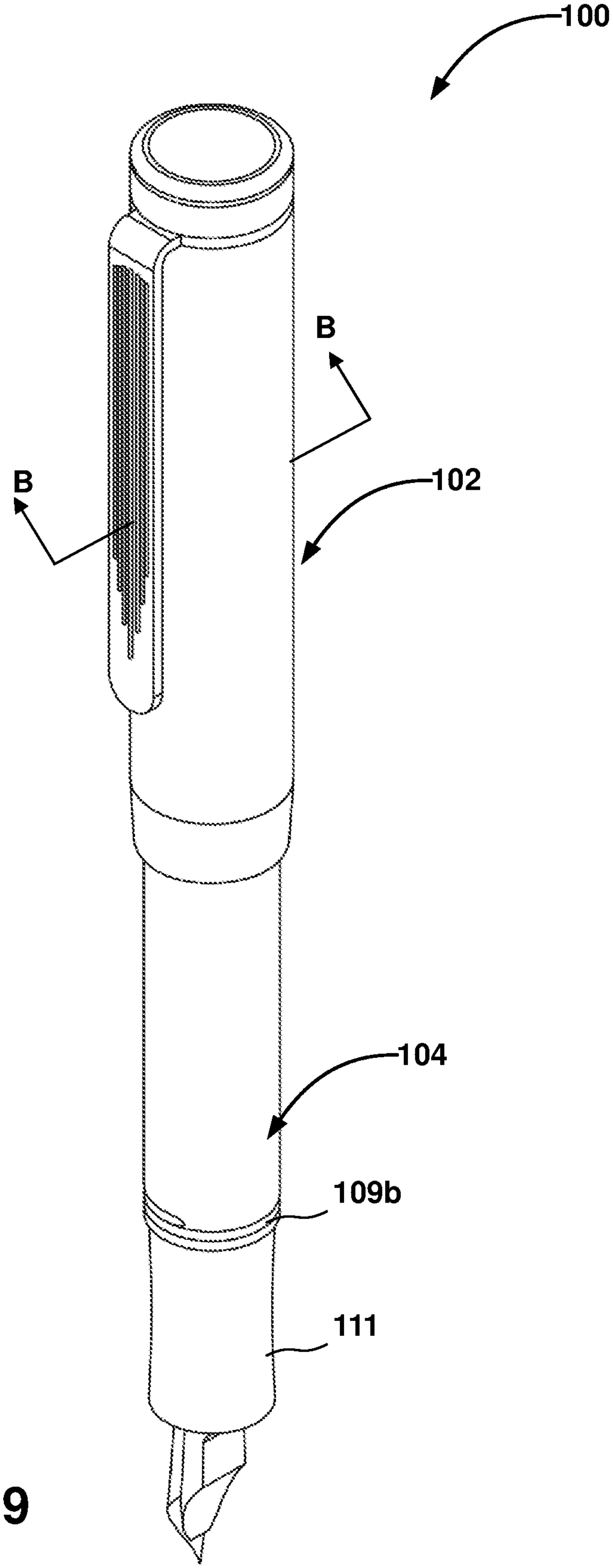
FIG. 9 shows the pen cap screwed at the back of the pen body to transform the compact pen into an extended-length pen for comfortable handling and writing.
Figure 10:
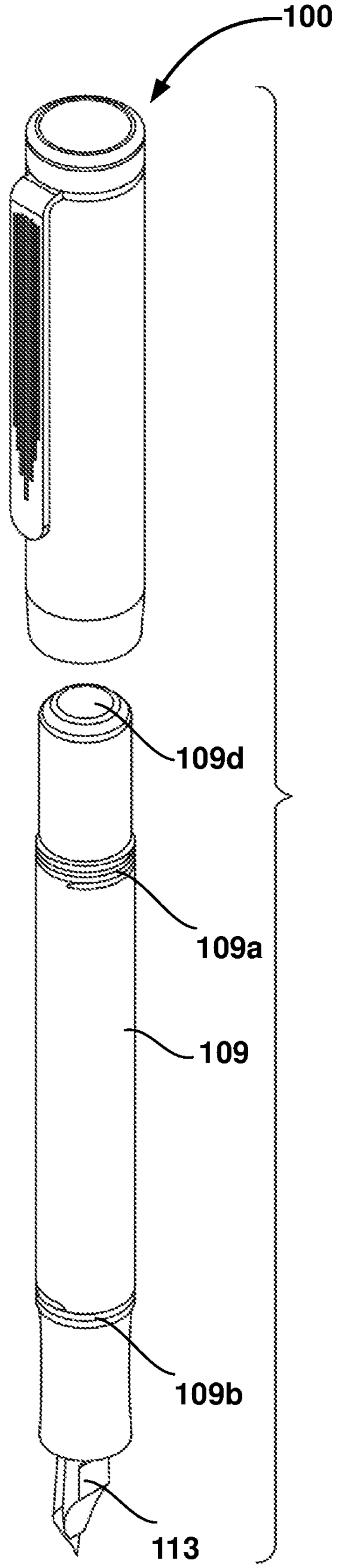
FIG. 10 shows a partially exploded view of the pocket-size pen of FIG. 9.
Figure 11:
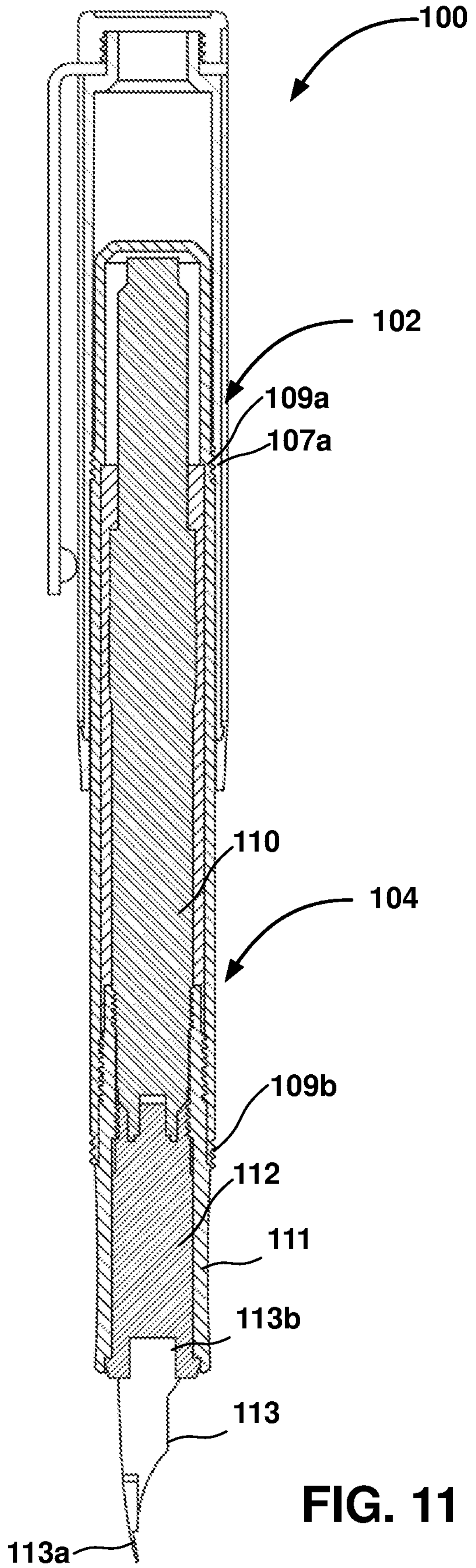
FIG. 11 is a cross-sectional view of the pocket-size pen of FIG. 9 along B-B.

The pen cap 102 consists of an internally configured first set of male threads 107*a*. The pen cap 102 is about 68 mm long. Referring specifically to FIG. 6, the pen cap 102 includes an inner cap 107. The inner cap 107 is substantially cylindrical in shape. The inner cap 107 includes the first set of male threads 107*a* configured on the inner walls (FIG. 8). The inner cap 107 further includes a protruding threaded extension 107*c* extending upward from its top, and a set of female threads 107*b* configured externally at the bottom. The pen cap 107 further includes an outer cap 101 open at two opposing ends. The outer cap 101 embodies or receives the inner cap 107 there inside during the assembly of pen cap 102 components. The pen cap 102 further embodies a clip 103. The clip 103 helps in carrying the pen 100. Particularly, the clip hangs the pen in the pocket. The clip 103 allows a pen user to accessibly reach it when needed or in other words, user can hang it by the clip 103 in the shirt, pocket, or even in the bag. In an embodiment, the clip 103 includes a ring 103*c* with a hole 103*a* and an arm 103*b* extending downwardly from the ring 103*c*. The pen cap 103 further includes another ring 104. The pen cap 102 additionally includes a first-end cap 105 with a top 105*a* and a downwardly extending sidewall 105*b*. During assembly, the ring 104 fits around the downwardly extending sidewall 105*b*. The pen cap 102 further includes a second end cap 108 with a set of male threads 108*a* internally configured therein to engage to the female threads 107*b* of the inner cap 107. Additionally, a flat dome 106 is attached to the top of the cap 102 to close the top 105*a* of the first end of cap 105. In some other embodiment, the flat dome 106 and the end cap 105 may be integrally formed as a single unit.

According to the embodiment, the pen body 104 includes a barrel 109 having externally configured and spaced apart a set of female threads 109*a*, and another set of female threads 109*b*. The barrel 109 is hollow inside with a top opening for receiving a full-sized standard ink source 110 there inside the cavity (not seen). The back or top end 109*d* of the barrel 109 is preferably closed. In an embodiment, the full-sized standard ink source 110 is an ink converter or an ink cartridge, if the pen is a fountain pen. The ink converter is about 7.5 cm in length. The ink cartridge is about 7.3 cm in length. In another embodiment, the full-sized standard ink source 110 may be a rollerball pen refill or a ballpoint pen refill. For the purpose of this application and to enable the claims, the term "full-sized standard ink source 110" either it is an ink converter or an ink cartridge or ink refill denotes standard sizes of these ink converters or ink cartridges or ink refills known in the industry. In the current industry norms, specifically the pen industry, the standard size ink converter is 7.5 or 7.6 cm in length, and the standard size ink cartridge is 7.33 cm (most pens accept this size). Some industry guides highlight this fact, for example, but are not limited to luxipens.com, and executivepensdirect.com. Further, for the purpose of this application the term "conventional pen" refers to pens of usually 140 cm or 142 mm basically available in the market.

In assembly, the male threads 107*a* of the pen cap 102 engage the female threads 109*b* of the pen body 104 for closing the pen 100 for storage and reducing the overall length of the pocket-size pen 100 to about 120 mm, unlike conventional pens which are usually 140 mm or 142 mm in length when closed or stored in non-writing mode. According to the embodiment, the reduction in length of the pocket-size pen 100 is by about 20 mm or 22 mm compared to the conventional pen. Likewise, the male threads 107*a* of the pen cap 102 engage the female threads 109*a* of the pen body 104 for transforming (to writing mode) the pocket-size pen 100 into the extended-length pen with a length of about 140 mm or 142 mm similar in length to the conventional pens and revealing the writing tip 113 for comfortable writing using the pen 100.

Figure 12:
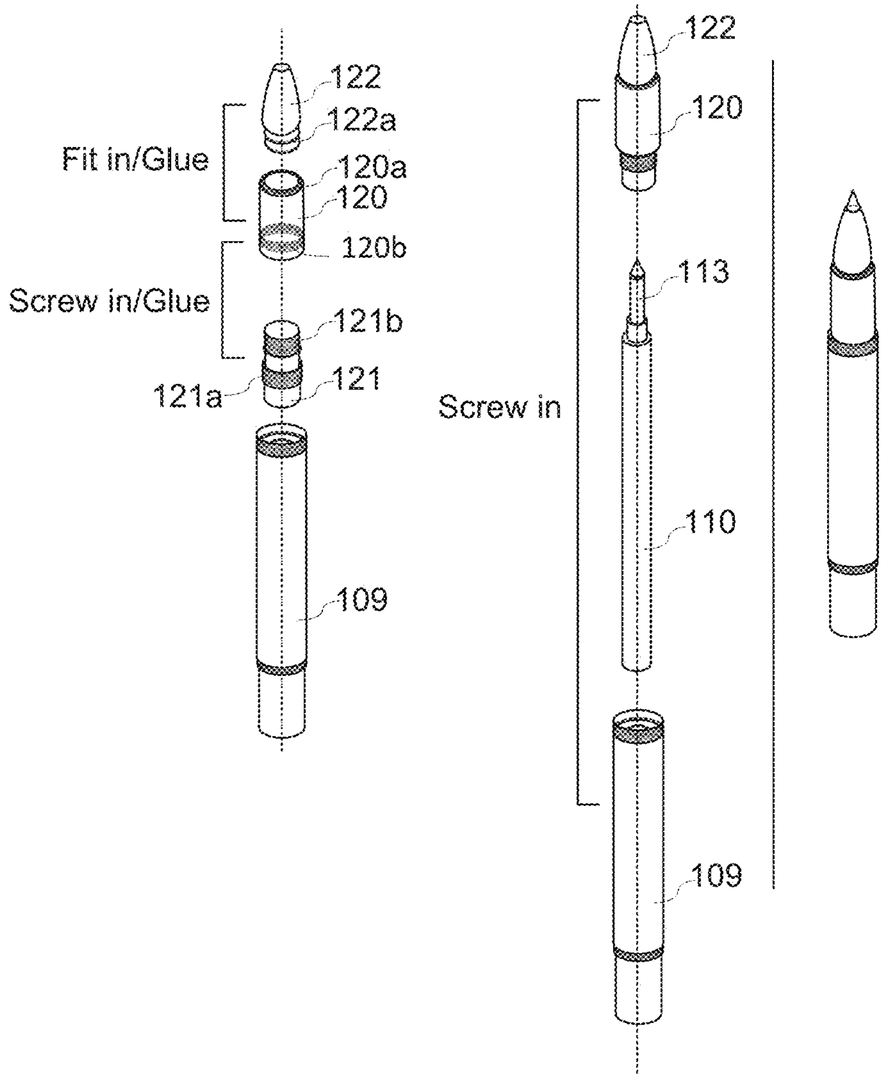
FIG. 12 shows a detailed exploded view of the pocket-size pen in accordance with another embodiment of the present invention.

The pen body 104 further includes a collar 111. The collar 111 includes a set of male threads 111*a* externally configured thereon, and the collar 111 further includes a set of female threads 111*b*. The male threads 111*a* engage with a set of female threads 109*c* configured internally in proximity to the top opening of the barrel 109 during assembly of the pen 100 enclosing the ink source inside the cavity of the barrel 109. Additionally, the collar 111 of the pen body 104 is a portion graspable by the user while using the pocket-size pen 100 for writing. In some other embodiment, for example in a rollerball pen assembly shown in FIG. 12, a collar 121 may not include the set of female threads 111*b* as described above rather the collar 121 may include two sets of external threads 121*a*, 121*b* as seen in FIG. 12.

The pen body 104 further includes a tip connector 112. The tip connector 112 includes a set of male threads 112*a* for engagement with a set of female threads 111*b* configured internally within the collar 111 during assembly of the pen 100. The tip connector 112 further comprises a hole 112*b* partially extending along the length of the tip connector 112. The hole 112*b* is adapted for receiving a second end 113*b* of a writing tip 113 in order to dispense the ink through a first end 113*a* while writing with the pocket-size pen 100. The writing tip 113 always remains in communication with the ink source 110 for receiving ink therefrom. The first end 113*a* of the writing tip 113 is a nib according to one embodiment. In some other embodiment, for example, in a rollerball pen assembly, as shown in FIG. 12, a sleeve 120 has two sets of internal threads 120*a* and 120*b* (the internal threads 120*b* are shown in broken lines), wherein one set of internal threads 120*b* would engage with the one set of external threads 121*b* of the collar 121 and another set of internal threads 120*a* would engage with external threads 122*a* present on a pen tip 122 as shown in FIG. 12. The pen tip 122 comprises an opening for revealing the writing tip 113 of the refill 110 of the rollerball pen.

Furthermore, in an embodiment, the female threads 109*a* of the pen body 104 divide the barrel 109 into a first portion 109*e*, and a second portion 109*f*. The first portion 109*e* is larger in length compared to the second portion 109*f* and wherein both first portion 109*e* and the second portion 109*f* may be uniform or non-uniform in diameter throughout their lengths.

The pen 100 and associated components discussed hereinabove may be made using different material known in the art and in different shapes and sizes.

While the invention has been described in connection with what is presently considered to be the most practical and preferred embodiments, it is to be understood that the invention is not to be limited to the disclosed embodiments, but, on the contrary, is intended to cover various modifications and equivalent arrangements included within the spirit and scope of the present invention.

What is claimed is:

1. A pocket-size pen (100), comprising:

a pen cap (102) having an internally configured first set of male threads (107*a*);

a pen body (104) adapted to be grasped during use, the pen body (104) comprises a barrel (109) having externally configured and spaced apart first set of female threads (109*a*), and a second set of female threads (109*b*), wherein the barrel (109) is hollow inside with a top opening for receiving a full-sized standard ink source (110) there inside;

wherein, the first set of male threads (107*a*) of the pen cap (102) engages the second set of female threads (109*b*) of the pen body (104) for closing a writing tip (113) which is in fluid communication with the full-sized standard ink source (110) reducing the length of the pocket-size pen (100) for storage in the pocket of a user; and wherein, the first set of male threads (107*a*) of the pen cap (102) engages the first set of female threads (109*a*) of the pen body (104) for transforming the pocket-size pen (100) into an extended-length pen similar in length to a conventional pen and revealing the writing tip (113) for comfortable writing using the pen (100).

2. The pocket-size pen (100) of claim 1, wherein the pen cap (102) comprises an inner cap (107) consisting of the first set of male threads (107*a*) configured on the inner walls, a protruding threaded extension (107*c*) extending upward from the top, and a third set of female threads (107*b*) configured externally at the bottom;

an outer cap (101) open at two opposing ends, and configured for receiving the inner cap (107);

a clip (103) having a first ring (103*c*) with a hole (103*a*) and an arm (103*b*) extending downwardly from the first ring (103*c*);

a second ring (104);

a first end cap (105) with a top (105*a*) and a downwardly extending sidewall (105*b*);

a second end cap (108) with a second set of male threads (108*a*) internally configured to engage to the third set of female threads (107*b*) of the inner cap (107); and a flat dome (106) configured to attach and close the top (105*a*) of the first end cap (105).

3. The pocket-size pen (100) of claim 1, wherein the pen body (104) comprising a collar (111) with a third set of male threads (111*a*) externally configured thereon, wherein the third set of male threads (111*a*) engages with a fourth set of female threads (109*c*) configured internally in proximity to the top opening of the barrel (109);

a tip connector (112) with a fourth set of male threads (112*a*) for engagement with a fifth set of female threads (111*b*) configured internally within the collar (111); and the writing tip (113) with a first end (113*a*) and a second end (113*b*), wherein the writing tip (113) is in communication with the ink source (110) for receiving ink therefrom.

4. The pocket-size pen (100) of claim 3, wherein the tip connector (112) further comprises a hole (112*b*) partially extending along the length of the tip connector (112).

5. The pocket-size pen (100) of claim 3, wherein the hole (112*b*) is adapted for receiving the second end (113*b*) of the writing tip (113) in order to dispense the ink through the first end (113*a*) while writing with the pocket size pen (100).

6. The pocket-size pen (100) of claim 1, wherein the full-sized standard ink source (110) is selected from a group of ink sources consisting of an ink converter, an ink refill, and an ink cartridge.

7. The pocket-size pen (100) of claim 1, wherein the standard-sized ink converter is about 7.6 cm or 7.5 cm in length.

8. The pocket-size pen (100) of claim 1, wherein the ink cartridge is about 7.3 cm in length.

9. The pocket-size pen (100) of claim 1, wherein the pocket-size pen (100) is selected from a group of pens consisting of a fountain pen, a rollerball pen, or a ball point pen.

10. The pocket-size pen (100) of claim 1, wherein the collar (111) of the pen body (104) is graspable by the user while using the pocket-size pen (100) for writing.

11. The pocket-size pen (100) of claim 1, wherein the first set of male threads (107*a*) of the pen cap (102) engages the second set of female threads (109*b*) of the pen body (104) for reducing the length of the pocket-size pen (100) to about 120 mm.

12. The pocket-size pen (100) of claim 11, wherein the reduction in length of the pocket-size pen (100) is by about 20 mm compared to the conventional pen.

13. The pocket-size pen (100) of claim 1, wherein the first set of male threads (107*a*) of the pen cap (102) engages the first set of female threads (109*a*) of the pen body (104) for transforming the pocket-size pen (100) into the extended-length pen with a length of about 140 mm similar in length to the conventional pen.

14. The pocket-size pen (100) of claim 1, wherein the first set of female threads (109*a*) of the pen body (104) divides the barrel (109) into a first portion (109*e*), and a second portion (109*f*).

15. The pocket-size pen (100) of claim 14, wherein the first portion (109*e*) is larger in length compared to the second portion (109*f*) and is uniform in diameter throughout its length or nonuniform in diameter throughout its length.

16. The pocket-size pen (100) of claim 4, wherein the second portion (109*f*) is uniform in diameter throughout its length or non-uniform in diameter throughout its length.

17. The pocket-size pen (100) of claim 3, wherein the first end (113*a*) of the writing tip (113) is a nib.

18. The pocket-size pen (100) of claim 1, wherein the pen cap (102) is about 68 mm long.

19. The pocket-size pen (100) of claim 1, wherein the pen body (104) comprising a collar (121) with two sets of threads (121*a*, 121*b*) externally configured thereon; and a sleeve (120) having two sets of internal threads (120*a*, 120*b*), wherein one set of internal threads (120*b*) engage with the one set of external threads (121*b*) of the collar (121) and another set of internal threads (120*a*) engages with a set of external threads (122*a*) present on a pen tip (122) having an opening for revealing the writing tip (113) of the full-sized standard ink source (110).

* * * * *